A. E. SUWALSKI, L. J. LEININGER AND J. N. M. WILSON.
FUMIGATOR.
APPLICATION FILED SEPT. 28, 1914.
1,316,066.
Patented Sept. 16, 1919.
2 SHEETS—SHEET 1.
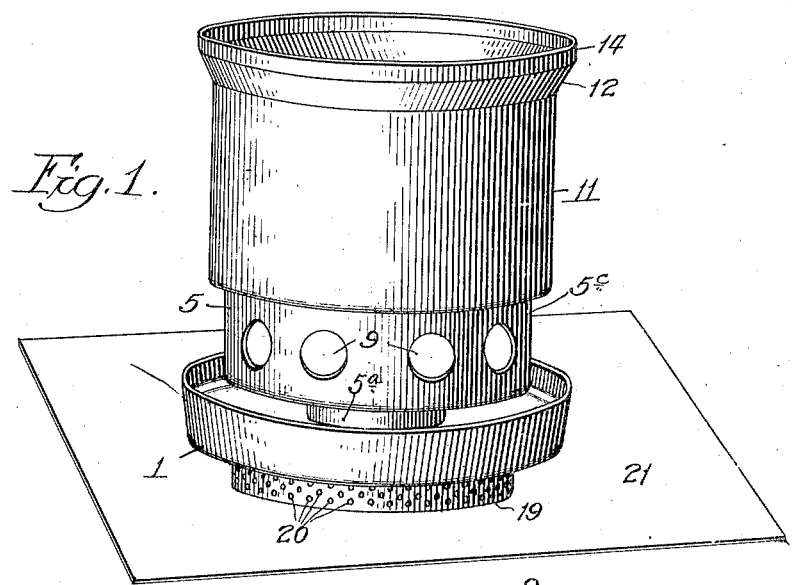
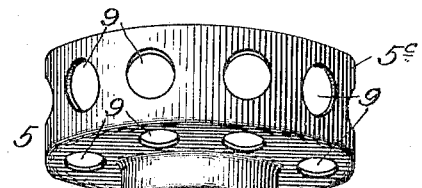
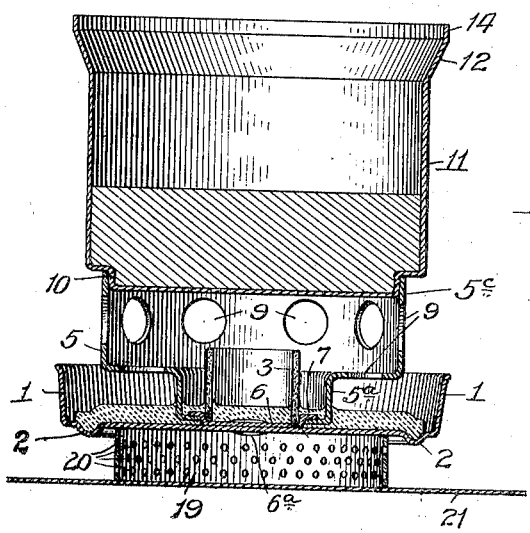
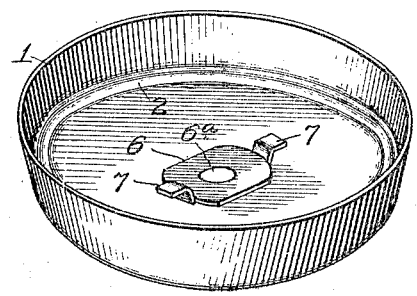
Witnesses:
John Enders
L. C. French
Inventors
James N. M. Wilson
Leonard J. Leininger &
Alexander E. Suwalski
by Fred Garlach
their Atty

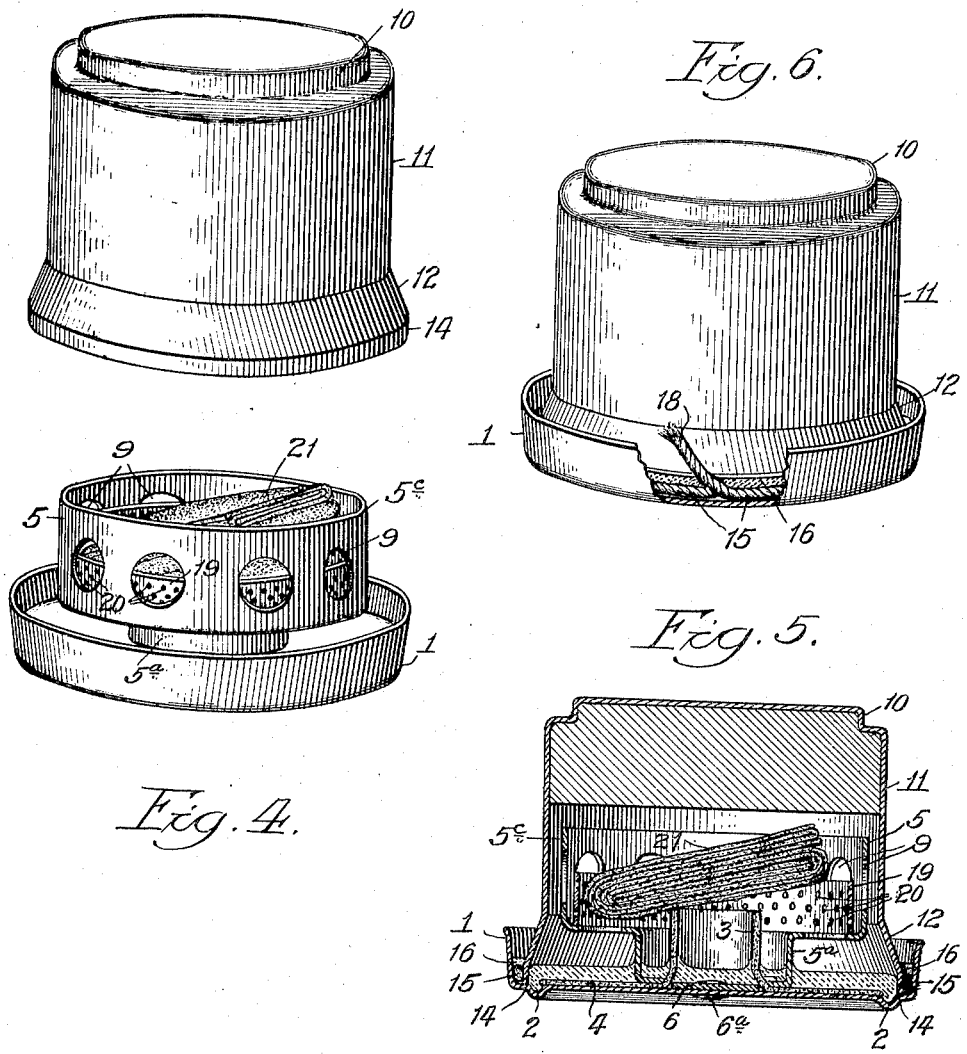

UNITED STATES PATENT OFFICE.

ALEXANDER E. SUWALSKI, LEONARD J. LEININGER, AND JAMES N. M. WILSON, OF CHICAGO, ILLINOIS, ASSIGNORS TO CENTRAL CITY CHEMICAL COMPANY, OF CHICAGO, ILLINOIS, A CORPORATION OF ILLINOIS.

FUMIGATOR.

1,316,066.   Specification of Letters Patent.   Patented Sept. 16, 1919.

Application filed September 28, 1914. Serial No. 863,877.

*To all whom it may concern:*

Be it known that we, ALEXANDER E. SUWALSKI, LEONARD J. LEININGER, and JAMES N. M. WILSON, residents of Chicago, in the county of Cook and State of Illinois, have invented certain new and useful Improvements in Fumigators, of which the following is a full, clear, and exact description.

The invention relates to fumigators, of the character in which solidified formaldehyde is used as the disinfectant.

The invention designs to provide a new and improved form of connection between the fuel pan and the fuel shield to positively lock said members together to hold the wick in place on the pan and within the shield and which will prevent the combustible fuel, such as paraffin, from being loosened from the fuel pan.

The invention further designs to provide means for sealing the disinfectant cup to the pan, which effectually protects the fuel and the disinfectant from the atmosphere and to keep the fuel intact and ready for use by an outer seal which is independent of the fuel within the pan so that it can be broken without disturbing the fuel.

The invention further designs to provide a new and improved form of support for the device which may be carried within the device when it is not in use, and which, when in use, dispenses with the usual water pan employed in connection with devices of this kind, to prevent the device from burning the table, floor or surface upon which the device is set.

The invention further designs to provide a new and improved form of fumigator.

The invention further designs to provide an improved construction of the device set forth in Letters Patent of the United States No. 1,009,816, dated November 28, 1911.

The invention consists in the several features hereinafter set forth and more particularly defined by claims at the conclusion hereof.

In the drawings: Figure 1 is a perspective view of a fumigator embodying the invention in operative position. Fig. 2 is a vertical sectional view thereof. Fig. 3 is a detail perspective view of the fuel pan, wick and fuel shield showing the interlocking connection between the pan and the shield. Fig. 4 is a perspective view of the device before it has been sealed. Fig. 5 is a vertical sectional view of the device when sealed and packed for shipment. Fig. 6 is a section of the device sealed and ready for shipment.

The fumigator comprises a fuel receptacle, a disinfectant receptacle, means for supporting the disinfectant receptacle upon the fuel receptacle, and a support for the fuel receptacle.

The fuel receptacle comprises a shallow pan 1 having an annular groove 2 in the bottom thereof and into which combustible fuel, such as paraffin, is adapted to be placed. A tubular wick 3, formed preferably of asbestos or non-heat conducting material and having a plurality of projecting arms 4 which radiate from the bottom of said wick and serve as a support therefor, is arranged centrally within the fuel pan 1. A tubular shield and support 5 surrounds the wick 3 at its reduced bottom portion $5^a$, being secured to the pan 1 and thereby securing the wick to the pan by a locking connection which consists of a plate 6 secured centrally to the bottom of the pan 1 by a rivet $6^a$ and having tongues 7 thereon adapted to fit in corresponding notches 8 in the bottom $5^a$ of the tubular shield 5 so that, when the wick is arranged within the pan and the shield 5 is placed so that its bottom $5^a$ rests upon arms 4 of the wick and tongues 7 register with the notches 8, the shield may be turned to cause the tongues to engage the said bottom of the shield 5 and secure the shield and wick to the bottom of the pan. Fluid paraffin is then poured into the pan in an amount sufficient to successfully carry on the vaporizing operation of the disinfectant within the cup, and when the paraffin has congealed it will secure this interlocking connection in locking position and the paraffin will be held within the pan against removal by accidental dislodgment. The wick shield 5 has perforations 9 which afford ventilation for the flame from the wick 3 when the device is in operation. The upper portion of the shield 5 is enlarged, as at $5^c$, to fit snugly around the lower reduced portion 10 of the cylindrical disinfectant vessel or cup 11 to support the same. The disinfectant cup 11 is flared at its upper end, as shown at 12 (Figs. 2 and 5) and has a straight portion 14 at the end adjacent the flare 12, said upper portion being designed to fit within the pan 1 when the cup is inverted within the device when assembled for shipment.

In practice the paraffin is poured into the pan, as previously described, and, when in semi-solid condition, a suitable form is pressed down over it so as to remove the fuel from the side of the pan, so there will be a channel with no paraffin therein adjacent the side of the pan, then the disinfectant cup with the disinfectant therein is inverted and placed into said channel. Sealing means are provided between the outside of the top portion 14 of the cup 11 and the side of the pan 1, which comprises a strip of cord or flexible element 15 and sealing fluid 16. The cord 15 is placed in the channel between the cup and the pan and pressed down firmly therein, after which sealing material 16, such as paraffin, is poured over the cord and into said channel and independently of the fuel in the pan to effectually seal the element within the pan and the cup from the atmosphere. To break the seal, all that is necessary is to grasp the free or projecting end 18 of the cord 16 and pull it out of the channel, which will result in cutting the seal 16 away from the sides of the pan and cup and permit of the removal of the cup.

A cylindrical support 19 consists of a ring having therein a series of perforations 20, which is adapted to support the bottom of the pan 1 within the circular grooved portion 2 and by reason of the perforations permits air to circulate under the fuel pan and serves as an insulator to prevent the heat from the pan from scorching any table upon which the device may be set. As a further protection the ring 19 may be placed upon an asbestos mat 21 which is spread on the table or floor when the device is in use.

In devices of this kind it is necessary that they be put in as compact a package as possible. To provide for this the support and the mat have been constructed so that they may be placed within the tubular shield 5, the cup 11 placed in inverted position upon the pan and the whole device effectually sealed by the cord 15 and the seal 16.

The device set forth exemplifies one in which provision is made for effectually locking the wick shield to the fuel pan, so that any accidental dislodgment of the congealed paraffin or the fuel shield is prevented in the shipping or handling of said device.

The invention also exemplifies a fumigator in which provision is made for effectively connecting the wick shield to the fuel pan so that when the device is in operation and the paraffin has become melted and liquefied, neither the wick shield and the cup supported thereon can be accidentally tipped from the fuel pan.

The invention also exemplifies a fumigator in which the wick is securely held in position in the pan by the shield and the interlocking connection between the shield and the pan. The invention also exemplifies an improved seal between the cup and the fuel pan, which is made independently of the paraffin fuel in the pan when it is utilized as a cover for the cup, so that when the combined cover and pan is separated from the cup the cup will not tend to break the paraffin fuel. The invention also exemplifies an improved insulating ring or support which may be placed under the fuel pan to prevent the floor or table on which the fumigator is used from being scorched and this insulator is constructed so that it may be packed and retained in the cup.

The invention is not to be restricted to the details set forth, since these may be modified within the scope of the appended claims without departing from the spirit and scope of the invention.

Having thus described the invention, what we claim as new and desire to secure by Letters Patent, is:

1. A fumigator comprising a fuel pan having a bottom, a disinfectant vessel, a separable and interlocking connection between the bottom of the pan and the support and a semi-solid fuel in which said connection is embedded.

2. A fumigator comprising a fuel pan, a disinfectant vessel, a support for the vessel, a wick extended between the pan and the support, a semi-solid fuel in the pan and in which the wick is embedded, and a separable interlocking connection between the pan and the support, and securing the wick independently of the fuel.

3. A fumigator comprising a pan, a disinfectant vessel, a removable vessel support, a semi-solid fuel and wick in the pan, an interlocking connection between the support and the pan comprising a plate on the pan and provided with tongues, the support having notches for the passage of said tongues and a flange to interlock with the tongues.

4. A fumigator comprising a fuel pan, a disinfectant vessel, a support for said vessel, and connected to the pan, a wick within the support, and a semi-solid fuel in the pan and in which the wick is embedded, said support comprising a reduced tubular lower portion acting as a shield around the wick, an enlarged upper portion and a portion between the upper and lower portions adapted for connection to the lower portion of the vessel, said support being adapted to pass into the vessel.

5. A fumigator comprising a disinfectant vessel, a fuel pan containing congealed fuel, adapted to form a cover for the vessel and having a flange outside thereof, a sealing material independent of the fuel between the flange and the rim of the vessel, and a strip embedded in said material between the flange and the vessel and adapted to break and remove the sealing material when it is pulled apart from the pan.

6. A fumigator comprising a disinfecant vessel, a vessel support on the pan adapted to be placed into the vessel and a perforated ring smaller in diameter than the vessel and cover, to adapt it to be placed in the vessel and separate from the fuel pan so that it may be placed under the pan when it is inverted and into the vessel when the pan is used as a cover.

ALEXANDER E. SUWALSKI.
LEONARD J. LEININGER.
JAMES N. M. WILSON.

Witnesses:
CECELIA MASOVITCH,
WM. PREBER.

Copies of this patent may be obtained for five cents each, by addressing the "Commissioner of Patents, Washington, D. C."